Patented May 12, 1936

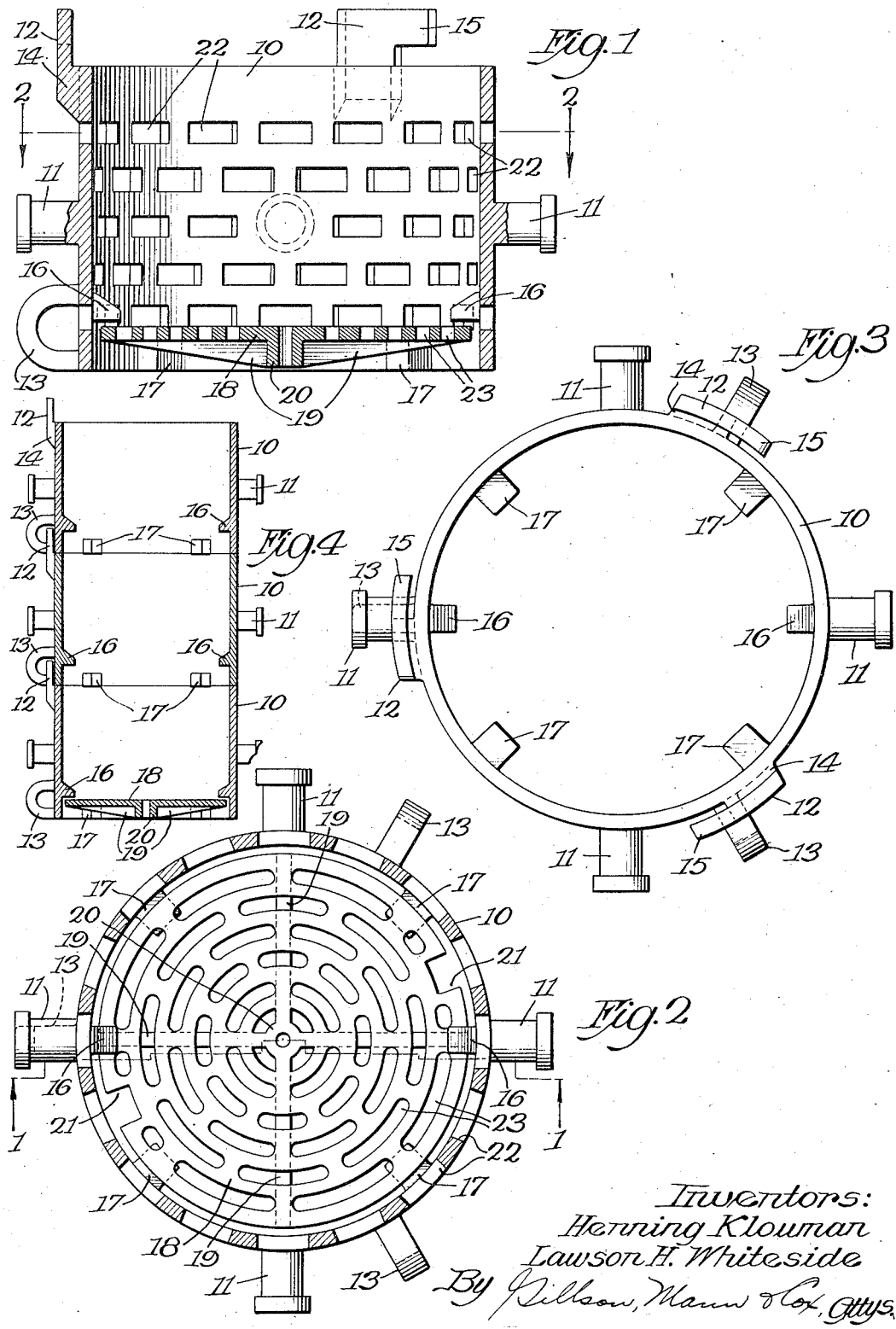

2,040,261

UNITED STATES PATENT OFFICE 2,040,261

BASKET FOR CARBURIZING RETORTS

Henning Klouman, Michigan City, Ind., and Lawson H. Whiteside, Chicago, Ill., assignors to Michiana Products Corporation, Michigan City, Ind., a corporation of Indiana Application July 25, 1935, Serial No. 33,040

4 Claims. (Cl. 263—47)

This invention relates to baskets for carburizing retorts. Those baskets are really mere containers for the parts to be carburized to facilitate getting the parts into and out of the retorts and to expose them for treatment while in the retort. The parts to be treated are cold when put in the baskets and are in much better conducting relation to the bottom of the basket than to its side wall. The bottom of the basket rests on the bottom of the retort while the wall is spaced from the walls of the retort and is traversed by the hot gases of the furnace. These conditions cause the bottom and the side wall of the basket to heat up differently and to expand differently, with the result that the baskets frequently break near the corner.

The principal object of this invention is to prevent breakage from this cause and is accomplished by making the wall sections separate from the bottom and free to expand and contract independently of it. Such a construction also lends itself to the assembly of baskets of different height by using one or more wall sections with a single bottom.

The preferred embodiment of the invention is shown in the accompanying drawing, in which Fig. 1 is a vertical section through a carburizing basket taken on the line 1—1 of Fig. 2;

Fig. 2 is a horizontal section through the basket taken along the line 2—2 of Fig. 1;

Fig. 3 is a plan view of two wall sections and a stack and secured together by interengaging hooks and eyes at their adjacent ends; and Fig. 4 is a vertical section through a tall basket made by assembling three wall sections end to end and providing the lower one only with a bottom.

But this specific drawing and the corresponding description are used for the purpose of disclosure only and are not intended to limit the claims to the particular construction.

The wall sections 10 of the basket are generally in the form of a hollow cylinder having trunnions 11 on the outside, hooks 12 at the upper end, and a corresponding number of eyes or loops 13 adjacent to the lower end. The hooks are offset outwardly, as indicated at 14 in Figs. 1, 3 and 4, to permit the wall sections to be stacked in alignment, the hooks 12 serving to guide the lower end of an upper section in this assembly. After they have been brought together, a slight rotation will bring the curved end 15 of each hook into the eye or loop 13 of the superposed section and secure the two together against lengthwise separation until there has been a reverse rotary movement.

Adjacent to the bottom and on the inside each wall section is provided with an upper set of lugs 16 and a lower set of lugs 17.

Each bottom section 18 is roughly in the form of a circular disk having reinforcing ribs 19 radiating from a central hollow boss 20 and tapering toward the edge of the disk. The periphery of the disk has notches 21 corresponding in size and position to the lugs 16, and, when aligned with those lugs, a bottom can be inserted through the top of the wall section and brought to rest upon the bottom supporting lugs 17, as shown in Figs. 1 and 4. Then, by a slight rotation, the notches 21 are taken out of alignment with the lugs 16, with the result that the basket can be turned over in discharging its contents without displacing the bottom.

Both the wall section and the bottom section are provided with a plurality of slots or perforations 22 and 23, respectively, arranged in series with the perforations of each series staggered with respect to those of an adjacent series. This arrangement permits the metal to cool in the casting operation without setting up strains that otherwise would result in cracking and drawing, particularly in the area adjacent to the sprue.

With the bottom and wall section made separately and loosely assembled, it is obvious that they can expand and contract freely with respect to each other without setting up any strain, such as was unavoidable in integrally-formed baskets of the past. Furthermore, it will be clear from Fig. 4 that by assembling a number of wall sections end to end and providing the lower one only with a bottom, a tall basket suitable for holding the shafts and such like can be assembled from parts which also may be used to form short baskets for use with parts of less dimension.

We claim as our invention:

1. A carburizing basket comprising a stack of like superposed cylindrical openwork enclosing wall sections and having an unobstructed interior and complementary means circumferentially carried by said sections for securing the same together when one section is slightly rotated relative to the adjacent section in one direction, and for releasing said sections when relatively rotated in the opposite direction.

2. A carburizing basket comprising a stack of like superposed cylindrical openwork enclosing wall sections adapted to be releasably secured together by relative rotation of each section with reference to the adjacent section in the proper direction, and an openwork bottom releasably secured to the lowest wall section of the stack.

3. A carburizing basket as set forth in claim 2, wherein the successive wall sections are each provided with a circumferential row of hooks projecting radially outwardly arranged near one end of each section, and a corresponding row of eyes arranged near the opposite end of each section, the hooks of one section being adapted to rotatively engage the eyes of the adjacent section.

4. A carburizing basket comprising a cylindrical enclosing wall, two spaced sets of lugs extending radially inwardly from the enclosing wall, the lugs of one set being out of alignment with the lugs of the other set, a bottom adapted to be secured between said sets of lugs and having spaced notches corresponding in size and number to the lugs of the upper set, whereby the bottom may be applied or removed when the corresponding lugs and notches are brought into juxtaposition or may be locked in place when the bottom is rotated slightly to bring the notches out of registry with the upper set of lugs.

HENNING KLOUMAN.
LAWSON H. WHITESIDE.